United States Patent [19]

Mizusaki et al.

[11] Patent Number: 5,122,896
[45] Date of Patent: Jun. 16, 1992

[54] ELECTROCHROMIC DISPLAY DEVICE WITH THE COUNTER ELECTRODE BEING PRELIMINARILY HELD IN REDUCED OR OXIDIZED STATE

[75] Inventors: Yasushi Mizusaki; Hiromasa Marumo; Tokuhisa Tsutsui, all of Nagano, Japan

[73] Assignee: K.K. Sankyo Seiki Seisakusho, Nagano, Japan

[21] Appl. No.: 413,649

[22] Filed: Sep. 28, 1989

[30] Foreign Application Priority Data

Sep. 29, 1988 [JP] Japan .................. 63-242591

[51] Int. Cl.⁵ .................................. G02F 1/01
[52] U.S. Cl. .................................. 359/273; 359/268; 359/269
[58] Field of Search .............. 357/25; 350/357; 359/268, 269, 273

[56] References Cited

U.S. PATENT DOCUMENTS

| 4,039,253 | 8/1977 | Jain | 350/357 |
| 4,550,982 | 11/1985 | Hirai | 350/357 |
| 4,693,564 | 9/1987 | Mori | 350/357 |
| 4,750,817 | 6/1988 | Samitells | 350/357 |
| 4,936,956 | 6/1990 | Wrighton | 357/25 |

FOREIGN PATENT DOCUMENTS 63-61077  3/1988  Japan .

OTHER PUBLICATIONS

"Prussian-Blue-Modified Electrodes: an Application for a Stable Electrochromic Display Device". Itaya et al., J. Appl. Phys., vol. 53, #1, Jan. 1982, pp. 804–805.

*Primary Examiner*—Rolf Hille
*Assistant Examiner*—Mahshid Saadat
*Attorney, Agent, or Firm*—Sughrue, Mion, Zinn Macpeak & Seas

[57] ABSTRACT

An electrochromic display device uses a metal-phthalocyanine derivative as an electrochromic material at the display electrode side and a metal-phthalocyanine derivative being preliminarily held in a reduced state or a redox material being stable in an oxidized state at the counter electrode side.

16 Claims, 1 Drawing Sheet

ELECTROCHROMIC DISPLAY DEVICE WITH THE COUNTER ELECTRODE BEING PRELIMINARILY HELD IN REDUCED OR OXIDIZED STATE

BACKGROUND OF THE INVENTION

The present invention relates to an electrochromic display device (which is hereinafter sometimes abbreviated ECD).

Compared to liquid crystals, ECD provides easy viewing in the absence of dependency on the angle of view. On the other hand, ECD does not have a long life to withstand repeated use and it is difficult to produce more than one color with ECD. Because of these disadvantages, efforts to commercialize ECD have met with only limited success.

It was already proposed that phthalocyanine complexes of metals be used as electrode materials to make ECDs capable of displaying in more than one color (see Unexamined Published Japanese Patent Application No. 63-61077). ECDs using metal complexes of phthalocyanine in the display electrode depend for their operation on the phenomenon that the phthalocyanine ring is partially oxidized by an electrochemical redox reaction to cause a color change subsequent to the formation of $\pi$-cation radicals. Depending on the redox potential, more than one color change such as blue, green or brown can be produced and this has been impossible with the prior art ECDs.

One important requirement for successful ECD operation is that redox reaction of a magnitude, that is equal to or greater than what occurs in the display electrode, should also be created in the counter electrode. The current practice employed to meet this requirement is to use an electrochromic material in the counter electrode which is the same as what is used in the display electrode but which is thicker than the latter by a factor of about 4. This practice, however, has a problem originating from the use of metal-phthalocyanine complexes; that is, such complexes are stable in a transition from the neutral blue state to a reduced state but they tend to deteriorate (decompose) when a positive voltage is applied to cause a transition from the neutral state ($V=0$) to an oxidized state. The present inventors therefore thought of extending the life of ECDs by making both a display and a counter electrode from a metal-phthalocyanine complex in such a way that the membrane at the counter electrode side is 40 times as thick as the membrane at the display electrode side. This method was effective in extending the device life to some extent but since deterioration does proceed in the metal-phthalocyanine complex in the counter electrode, there still remains the problems that the structure of the complex is slowly destroyed until it becomes no longer capable of producing a reversible color change. This problem is not limited to metal-phthalocyanine complexes and is found in other materials such as phenanthroline and bipyridine. It is therefore desired to develop an ECD with which it is guaranteed that the device can be driven, without deterioration, by as many times as are required to insure reasonable performance in commercial applications.

SUMMARY OF THE INVENTION

An object, therefore, of the present invention is to provide an ECD structure having enhanced resistance to deterioration in characteristics.

This object of the present invention can be attained by an electrochromic display device that uses a metal-phthalocyanine derivative as an electrochromic material both at the display electrode side and at the counter electrode side, with the metal-phthalocyanine derivative at the counter electrode side being preliminarily held in a reduced state.

In another aspect of the present invention, a metal-phthalocyanine derivative is also used as an electrochromic material at the display electrode side but a redox material that is stable in an oxidized state is used at the counter electrode side. In a preferred embodiment, said redox material is Prussian blue.

DETAILED DESCRIPTION OF THE INVENTION

The ECD of the present invention is described below in greater detail with reference to the accompanying drawings.

Figure 1:
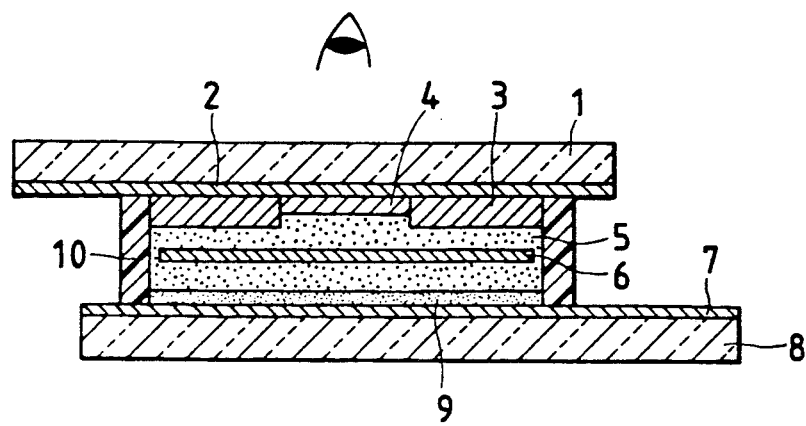
FIG. 1 is a longitudinal section of the central part of an ECD of a common liquid electrolyte type.

FIG. 1 is a diagrammatic cross section of an electrochromic display device of a common liquid electrolyte type. As shown, the ECD comprises a display electrode substrate 1, a transparent display electrode 2, an insulator film 3, an electrochromic material 4 (a redox material capable of undergoing reversible oxidation and reduction reactions; sometimes abbreviated as an EC material), a liquid electrolyte 5, a background plate 6 typically made of filter paper, a transparent counter electrode 7, a counter electrode substrate 8, an active counter electrode material 9, and a sealant 10.

The display electrode substrate 1 is typically made of a transparent material such as glass or plastic materials. A display electrode is composed of the transparent electrode in membrane form 2 and the EC material 4 which are laminated on the substrate 1. The areas of the transparent electrode 2 which are not laminated with the EC material 4 are masked with the insulation film 3 in such a way that a patterned display is obtained on a desired position, in a desired form, and in a desired layout.

The transparent electrode 2 may be formed of a known electro-conductive film material such as tin oxide ($SnO_2$) or indium oxide ($In_2O_3$). The insulation film 3 may be formed of a known insulating material such as an epoxy.

The EC material 4 is formed of a metal-phthalocyanine derivative, preferably cobalt (Co) phthalocyanine. The metal-phthalocyanine derivative (Mt-Pc)is a very stable metal complex having a tetraazaporphyrin skeleton and which has ligands coordinated in a macrocyclic form, with the metal ion being located in the center of a large $\pi$-electron system. The metal ion preferably derived from cobalt, may be replaced by other metals such as Fe, Zn, Ni, Cu, etc. The metal-phthalocyanine derivative is driven by applying negative electric charge and turns blue at 0 volts, green at 0.8 volts, and brown at 1.4 volts.

The liquid electrolyte 5 confined as an inter-electrode material between the support substrates 1 and 8 is preferably in the form of an aqueous solution containing a known electrolyte such as calcium chloride ($CaCl_2$). Other liquid electrolytes may of course be used and solid electrolytes are also usable.

A counter electrode is composed of the counter electrode substrate 8 which is laminated with the transparent electrode 7, which is then overlaid with the active counter electrode material 9. The active counter electrode material 9 is formed of a metal-phthalocyanine derivative, preferably Co-phthalocyanine, that is preliminarily held in a reduced state. The reduced metal-phthalocyanine derivative may be prepared by a process which comprises impregnating a carbon paste with a metal-phthalocyanine derivative, forming a film of said paste on the transparent electrode 7, thermally curing the film, and subjecting it to a reduction treatment. The counter electrode material 9 may be formed of a material that is stable in an oxidized state, such as Prussian blue or tungsten oxide, with the former being particularly preferred. In this preferred case, the active counter electrode material 9 can be prepared by first mixing Prussian blue with a carbon paste, making a film of the mixture on the transparent electrode, and curing the film. In order to insure uniform power supply to the active counter electrode material 9, it is preferably formed as a film on a layer of current collector such as Ag, Cu or C (not shown) that is formed on the counter electrode substrate 8. The layer of current collector is preferably made of a solderable material such as Cu or Ag since it provides ease in establishing contact with the drive circuit.

When a metal-phthalocyanine derivative is used as an EC material at the display electrode side and if one applies negative electric charge to said derivative so that it experiences a change of color by chemical reduction to provide a desired display, positive charge is applied to the counter electrode side, where an oxidation reaction of equal magnitude occurs to ensure that the metal-phthalocyanine derivative that is preliminarily held in a reduced state makes a transition to a more stable neutral (blue) state.

If a redox material such as Prussian blue that is stable in an oxidized state is used at the counter electrode side, it makes a transition from the neutral (blue) state to an oxidized yellow state upon excitation of the display electrode. Prussian blue is fairly stable in this yellow range and will not experience any substantial deterioration.

The reactions that occur at the display and counter electrode sides in the ECD of the present invention are summarized below:

| Display electrode: (Co-Pc) | blue (neutral) green or brown (reduced) (Co-Pc is cobalt phthalocyanine) |
|---|---|
| Counter electrode: reduced Co-Pc | reduction    oxidation brown or    blue (neutral) green (reduced) |
| PB | blue (neutral)  yellow (oxidized) (PB is Prussian blue) |

The neutral and oxidized forms of PB are respectively represented by the following structural formulas:

$\{Fe^{-3}[Fe^{II}(CN)_6]\}^-$ and $Fe^{-3}[Fe^{III}(CN)_6]$.

The ECD having the general structure shown above may be fabricated by the following procedure, with reference being made to the case where the display electrode is formed of Co phthalocyanine and the counter electrode is formed of Prussian blue.

First, a film of transparent electrode 2 is formed on the substrate 1 by a known thin-film process. The insulation film 3 is then formed on selected areas (non-display areas) of the transparent electrode film 2 by screen printing which may be effected using a screen of 200 mesh. The printed insulated film 3 is cured by heating at 150° C. for 1 h. Subsequently, the EC material 4 (Co phthalocyanine) is formed between the insulation films 3 by a known electrodeposition technique at a rate of ca. 5 $\mu A/cm^2$.

In a separate step, the transparent electrode 7 and the active counter electrode material 9 are printed sequentially on the counter electrode substrate 8. The active counter electrode material 9 is prepared from a carbon paste that contains Prussian blue as a redox material which is stable in oxidation reaction. The carbon paste is prepared by mixing carbon and prussian blue with a common binder resin for printing inks and then kneading the mixture together with a volatile solvent. The so prepared carbon paste is applied to the transparent electrode 7 by a known printing technique such as screen printing. The printed active counter electrode material 9 is cured by heating at 150° C. for 30 min.

The thus prepared display and counter electrode units are joined with a sealant 10 to fabricate a cell. The sealant 10 is typically a uv curable epoxy-modified polyacrylate, which is cured by irradiation with ultraviolet rays after the substrates 1 and 8 are joined together. The sealant 10 does not surround the entire circumference of the cell but is provided with a cutout that serves as an inlet for injecting a liquid electrolyte.

The cell is then transferred into a vacuum chamber which is depressurized for about 30 min to evacuate the interior of the cell. Thereafter, the cell is submerged in a liquid electrolyte vessel within the vacuum chamber, which is restored to atmospheric pressure to have the liquid electrolyte ($CaCl_2$) injected into the cell. The cutout in the sealant is closed with a uv curable epoxy-modified polyacrylate, which is then cured by irradiation with ultraviolet rays.

The embodiment described above is just one example of the preferred embodiments of the present invention and should not be taken as limiting. Various modifications may be made to this embodiment without departing from the spirit and scope of the present invention. For instance, the liquid electrolyte may be replaced by a solid electrolyte, which is covered with a protective resin coat in place of the glass substrate so as to fabricate a printed type of ECD. Further, the metal-phthalocyanine derivative may be replaced by phenanthroline or bipyridine. If Prussian blue is used as the active counter electrode material 9, a thin film of Prussian blue may be formed by electrodeposition using a liquid electrolyte composed of potassium ferricyanide ($5 \times 10^{-3}$ mol/l), potassium chloride ($5 \times 10^{-1}$ mol/l), ferric chloride ($5 \times 10^{-3}$ mol/l), polyvinyl amine ($5 \times 10^{-3}$ mol/l) and hydrochloric acid (trace). The condition for electrodeposition is 5 $\mu A/cm^2 \times 30$ min, with the electrolyte held at 20° C. As a result of this electrodeposition, a blue Prussian blue film is formed on the counter electrode. The Prussian blue film adheres tightly onto the counter electrode (ITO) since the molecules of Prussian blue are confined within polyvinyl amine, i.e., they are supported ionically on the cation group ($-NH^{3-}$) in the high-molecular weight cation (i.e., polyvinyl amine).

As described on the foregoing pages, the ECD of the present invention uses a preliminarily reduced metal-phthalocyanine derivative as an electrochromic material at the counter electrode side. Even if the device is driven with negative charge being applied to the metal-phthalocyanine derivative at the display electrode side so as to cause a color change from blue (neutral) to brown (in a reduced state), the metal-phthalocyanine derivative at the counter electrode side undergoes an oxidation reaction causing reversion from the stable reduced state (brown) to a further stable neutral state (blue). As a result, the ECD of the present invention will not deteriorate in performance to such an extent as to preclude its use in commercial applications.

If a redox material such as Prussian blue that is stable in an oxidized state is used as an electrochromic material at the counter electrode side, the ECD of the present invention has the added advantage that even if the display electrode is driven with negative change being applied to the metal-phthalocyanine derivative used as an electrochromic material at the display electrode side, the Prussian blue at the counter electrode side will not deteriorate since it undergoes an oxidation reaction causing a color change from the stable blue (neutral) state to a fairly stable (oxidized) yellow state.

Figure 2:
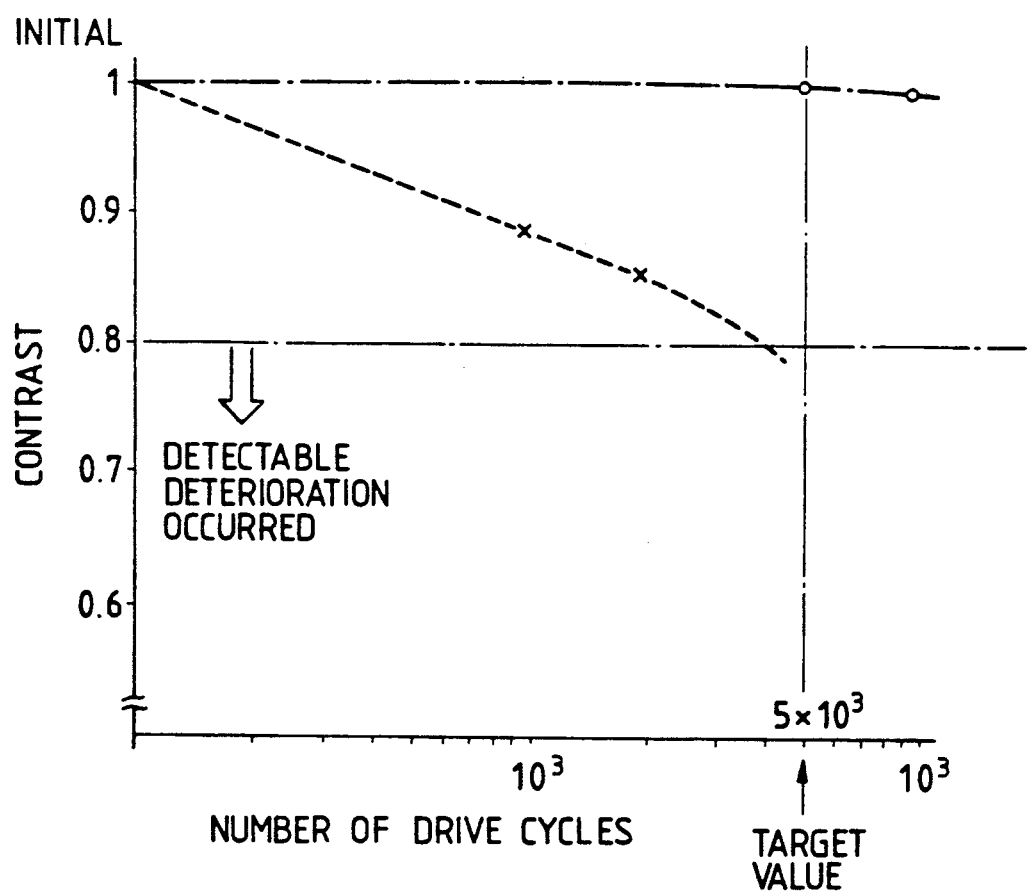
FIG. 2 is a graph showing the deterioration profiles of a display and a counter electrode having the same composition and an electrode pair having different compositions according to the present invention.

In short, the present invention offers the major advantage that even if an ECD using a metal-phthalocyanine derivative as an electrochromic material at the display applied to it, deterioration which would otherwise occur in the counter electrode can be suppressed to realize significant improvement in the life characteristics of the device. This may become apparent by looking at the graph in FIG. 2 which shows the results of testing for deterioration in two types of ECD. When oxidized Co phthalocyanine was used as an electrochromic material at both the display and counter electrode sides (as indicated by the dashed line), the ECD could not be driven by $5 \times 10^3$ times (a target value for satisfactory operation of commercially acceptable devices) even when the membrane thickness of the counter electrode was increased to four times as much as the thickness of the display electrode. In contrast, when Co phthalocyanine was used as an electrochromic material at the display electrode side whereas Prussian blue was used at the counter electrode side (as indicated by the one-long-and-one-short dashed line), the ECD could be driven by $5 \times 10^3$ times without any detectable deterioration in performance.

What is claimed is:

1. An electrochromic display device, having means for generating an initial electric charge, which makes use of a color change produced by a redox reaction, comprising an electrochromic material at a display electrode side and an electrochromic material at a counter electrode side, wherein said electrochromic material at the counter electrode side is preliminarily oxidized or reduced by applying said initial electric charge thereto, the magnitude of said initial charge being at least nearly equal to a charge magnitude required for oxidizing or reducing said electrochromic material at the display electrode side to produce a change of color, so that during use said electrochromic material at the counter electrode side will not be reduced or oxidized to a level at which said electrochromic material deteriorates.

2. An electrochromic display device according to claim 1, wherein said electrochromic materials at the display and counter electrode sides are of the same type.

3. An electrochromic display device according to claim 1, wherein a portion of said display electrode side is masked with an insulation film to obtain a patterned display.

4. An electrochromic display device which makes use of a color change produced by a redox reaction, comprising an electrochromic material at a display electrode side and an electrochromic material at a counter electrode side, wherein said electrochromic material at the display electrode side is oxidized or reduced to produce a change from a first color to a second color, said electrochromic material at the counter electrode side is of the same type as said electrochromic material at the display electrode side and is allowed to produce a change of color from a preliminarily oxidized or reduced state.

5. An electrochromic display device according to claim 4, wherein said electrochromic materials at the counter electrode side is preliminarily oxidized or reduced by an initial charge generating means, which applies an initial electric charge thereto, the magnitude of said initial charge being nearly equal to a charge magnitude required for oxidizing or reducing said electrochromic material at the display electrode side to produce a change of color.

6. An electrochromic display device, having a preliminary charging means, comprising a pair of display side and counter side substrates; at least said display side substrate being light-transmissive; a display electrode having a layer of electrochromic material disposed on an inner surface of said display side substrate with an active display electrode material being interposed; a counter electrode having a layer of electrochromic material disposed on an inner surface of said counter side substrate with an active counter electrode material being interposed; and an electrolyte disposed between said two electrodes;

wherein said electrochromic material at a counter electrode side is preliminarily oxidized or reduced with electric charge from said preliminary charging means, the quantity of which is at least nearly equal to that required for oxidizing or reducing said electrochromic material at a display electrode side to produce a change of color, so that said electrochromic material at the counter electrode side will not be reduced or oxidized to a level within the range where it deteriorates during used.

7. An electrochromic display device according to claim 4 or 6 wherein a metal-phthalocyanine derivative is used as said electrochromic material at the display electrode side whereas a metal-phthalocyanine derivative preliminarily held in reduced state is used as said electrochromic material at the counter electrode side.

8. An electrochromic display device which makes use of a color change produced by a redox reaction, comprising:

an electrochromic material at a display electrode side and an electrochromic material at a counter electrode side, wherein a metal-phthalocyanine derivative is used as said electrochromic material at the display electrode side, and a redox material is used as said electrochromic material at the counter electrode side, in which the reaction state of said metal-phthalocyanine derivative is restricted between a neutral state and a reduced state during use such that the oxidizing reaction on said redox material causes said metal-phthalocyanine derivative to be reduced.

9. An electrochromic display device according to claim 8, wherein said redox material is prussian blue.

10. An electrochromic display device according to claim 9, in which said prussian blue is reduced with electric charge before assembling said device, so that when said metal-phthalocyanine derivative is reduced, said prussian blue is restored to the natural state.

11. An electrochromic display device according to claim 8, wherein a metal-phthalocyanine derivative is used as said redox material at the counter electrode side, in which said metal-phthalocyanine derivative at the counter electrode side is reduced with electric charge before assembling said device, so that when said metal-phthalocyanine derivative at the display electrode side is reduced, said metal-phthalocyanine derivative at the counter electrode side is restored to the neutral state.

12. An electrochromic display device according to claim 8, wherein a portion of said display electrode side is masked with an insulation film to obtain a patterned display.

13. An electrochromic display device comprising:
a pair of display side and counter side substrates;
at least said display side substrate being light-transmissive;
a display electrode having a layer of electrochromic material disposed on an inner surface of said display side substrate with an active display electrode material being interposed;
a counter electrode having a layer of electrochromic material disposed on an inner surface of said counter side substrate with an active counter electrode material being interposed; and
an electrolyte disposed between said two electrodes; wherein a metal-phthalocyanine derivative is used as said electrochromic material at the display side, and a redox material is used as said electrochromic material at the counter side, in which the reaction state of said metal-phthalocyanine derivative is restricted between a neutral state and a reduced state during use, so that the oxidizing reaction on said redox material causes said metal-phthalocyanine derivative to be reduced.

14. An electrochromic display device according to claim 13, wherein said redox material is prussian blue.

15. An electrochromic display device according to claim 14, in which said prussian blue is reduced with electric charge before assembling said device, so that when said metal-phthalocyanine derivative is reduced, said prussian blue is restored to the natural state.

16. An electrochromic display device according to claim 13, wherein a metal-phthalocyanine derivative is used as said redox material at the counter side, in which said metal-phthalocyanine derivative at the counter side is reduced with electric charge before assembling said device, so that when said metal-phthalocyanine derivative at the display side is reduced, said metal-phthalocyanine derivative at the counter side is restored to the neutral state.

* * * * *